(12) United States Patent
Gleason et al.

(10) Patent No.: US 8,075,769 B1
(45) Date of Patent: Dec. 13, 2011

(54) IN-LINE P-TRAP CHLORINATOR

(76) Inventors: John F. Gleason, Denham Springs, LA (US); Benton Russell, Denham Springs, LA (US)

(*) Notice: Subject to any disclaimer, the term of this patent is extended or adjusted under 35 U.S.C. 154(b) by 0 days.

(21) Appl. No.: 11/764,981

(22) Filed: Jun. 19, 2007

Related U.S. Application Data

(60) Provisional application No. 60/815,145, filed on Jun. 21, 2006.

(51) Int. Cl.
*C02F 1/76* (2006.01)
(52) U.S. Cl. .......... 210/206; 137/268; 422/278
(58) Field of Classification Search .......... 210/749, 210/756, 758, 764, 198.1, 199, 205, 206, 210/167.11, 167.3, 209; 62/285, 288, 291, 62/279; 137/247.41, 247.51, 268, 247.49; 422/261, 263, 278, 264, 274, 275, 276, 277; 4/679, 681
See application file for complete search history.

(56) References Cited

U.S. PATENT DOCUMENTS

| | | | | |
|---|---|---|---|---|
| 207,644 | A | * | 9/1878 | Clark .......... 137/268 |
| 278,045 | A | * | 5/1883 | Reich .......... 137/268 |
| 709,871 | A | * | 9/1902 | Cluckies .......... 4/679 |
| 3,480,021 | A | * | 11/1969 | Ewald, Jr. .......... 4/679 |
| 4,403,355 | A | * | 9/1983 | Petty .......... 4/679 |
| 5,402,813 | A | | 4/1995 | Keen |
| 6,550,264 | B1 | * | 4/2003 | Cantolino .......... 210/268 |
| 6,701,740 | B1 | | 3/2004 | Hernandez-Zelaya |
| 6,895,771 | B1 | | 5/2005 | Cantolino |
| 6,915,814 | B2 | * | 7/2005 | Cheng .......... 137/247.51 |
| 2006/0191833 | A1 | * | 8/2006 | Greene et al. .......... 210/206 |

* cited by examiner

*Primary Examiner* — Nam Nguyen
*Assistant Examiner* — Lucas Stelling
(74) *Attorney, Agent, or Firm* — Reginald F. Roberts, Jr.

(57) ABSTRACT

An in-line P-trap chlorinator that ensures water contact with a water-leachable algicide and/or antibacterial tablet while water is flowing through the P-trap, and after the flow of water has stopped. The in-line P-trap chlorinator is inserted in a condensation drain line of an air-conditioning or refrigerating unit to prevent formation of growth from bacteria or algae, which would plug the line, and/or to destroy any such growth already in the line. The inlet to the P-trap chlorinator is above the outlet, to prevent back-migration of harmful and/or corrosive gases, vapors, and/or liquids/mixtures/solutions. The P-trap chlorinator performs and combines the functions of a P-trap and a chlorinator. No additional P-trap is required.

2 Claims, 7 Drawing Sheets

# IN-LINE P-TRAP CHLORINATOR

CROSS-REFERENCE TO RELATED APPLICATION

The present application is based on a provisional application No. 60/815,145, filed Jun. 21, 2006.

BACKGROUND OF THE INVENTION

The present invention relates to condensation lines or cold-water drain lines. More particularly, the invention relates to the prevention of clogging or plugging of such lines by growth of cold-water algae or bacteria.

Condensate is formed in all refrigeration systems. This condensate is formed by warm moist air being forced over the cold coils of the evaporator. The evaporator is located in the attic space in most homes. Removing this condensate has always presented many problems. The condensate can be removed in several ways. It can be piped to the outside. This is not an option for most homes because of unit placement and roof design. Another way is to pipe to a sewer vent line in the attic, thereby piping the condensate to the sewer system. The drawback of this second method is that the condensate must be piped through a plumber's trap, commonly known as a P-trap. A P-trap must be installed to prevent sewer gases from being drawn into the living space of the home by the suction of the evaporator fan. P-traps are notorious for plugging due to the small flow going through the trap, and due to the attic temperature, both of which promote growth of cold-water algae. When the P-trap becomes plugged, the flow of condensate stops. A secondary drain pan is a requirement of the plumber's code in most if not all areas. The pan is located beneath the evaporator. The pan catches and holds the condensate, or sends the condensate out a secondary drain line. If the condensate is held in the drain pan, a safety shut-off switch, located in the pan, stops the air-conditioner unit. The ability to stop the unit depends on several things, pan installation and condition being the most important. If either is not right, the condensate could drain from the unit onto the ceiling, which causes at least water spots and at worst a ruined ceiling. If the switch stops the unit, the living space is not being cooled. In order for the air conditioner to restart, the P-trap must be unplugged and the secondary drain pan emptied. This is usually done by a service technician on a service call. It is accomplished by disconnecting or cutting the drain line, blowing the plug out, flushing the pipe, and reconnecting. Depending on the unit, the attic temperature, and the quality and time of the last cleaning, this condition can occur two or three times in a normal cooling season.

There have been numerous devices patented which deal with the problem of plugging of drain lines by algae/bacterial growths. Most of these patents teach cleaning the line after a plug has formed and stopped water flow.

There are few patented devices that could be used to prevent the formation of a plug in a drain line. U.S. Pat. Nos. 6,701,740 and 5,402,813 disclose two such devices. The devices are installed in the condensate drain line downstream of an evaporator. If a chlorine-releasing tablet were used with these devices, chlorine gas and/or a chlorine-water mixture/solution could and probably would back-migrate into a condensation line to a cooling unit to which the condensation line is connected. Some units have a plastic tray under the evaporator coil. Unfortunately, the plastic from which the tray is made breaks down over time and leaks. Both chlorine and hydrochloric acid are corrosive. If the chlorine and the water should form hydrochloric acid, both the chlorine and the acid would then attack the sheet metal of the unit, and the result would be catastrophic.

U.S. Pat. No. 6,895,771 discloses a device for recycling the condensate in the drain line for reuse. There are two P-trap-like fittings on the inlet of the device. There is nothing to keep these fittings from plugging by algae/bacteria-promoting growths. Moreover, a check valve included in the device would also be subject to such plugging.

U.S. Pat. No. 5,402,813 to Keen discloses an in-line chlorinator for a condensation line. A first disadvantage of the in-line chlorinator disclosed by Keen is that it requires a separate P-trap in the drain line. A second disadvantage is that chlorine, hydrochloric acid, and/or gases from a sanitary sewer line can migrate back through the inlet and the condensation line to a cooling unit to which the condensation line is connected. The present invention provides a solution to both of these problems

SUMMARY OF THE INVENTION

In general, the present invention in a first aspect provides an in-line P-trap chlorinator comprising (a) a container; (b) an inlet for admitting water to the container; (c) an outlet for discharging water from the container; and (d) support means disposed within the container, for supporting a tablet of a water-leachable algicide and/or antibacterial substance. The inlet and the outlet are disposed above the support means, and the inlet is disposed at or above level of the outlet, whereby water level in the container is at the level of the outlet, so that water flowing through the container would contact a tablet disposed on the support means, and would continue to contact the tablet after flow has ceased; and so that gases and/or vapors are prevented from flowing back through the inlet.

The container has a bottom, and first and second lateral walls. Water is provided to the container by a conduit having a horizontal portion connecting first and second vertical portions to one another. The interior wall of the horizontal portion of the conduit is the bottom of the container, and has an opening for discharging water into the container. The interior wall of the first vertical portion of the conduit is a lower portion of the first lateral wall of the container. The interior wall of the second vertical portion of the conduit is a lower portion of the second lateral wall of the container. The inlet is to the first vertical portion of the conduit. The outlet is to the second vertical portion of the conduit. Water is discharged from the horizontal portion of the conduit into the container through the opening in the bottom of the container.

In a second aspect, the invention provides an in-line P-trap chlorinator comprising (a) a container having a bottom, and first and second lateral walls; (b) an inlet for admitting water to the container; (c) an outlet for discharging water from the container; (d) a conduit connecting the inlet and the outlet to one another, the conduit having interior and exterior walls, and a horizontal portion connecting first and second vertical portions to one another, the interior wall of the horizontal portion of the conduit being the bottom of the container, and having an opening for discharging water into the container; and (e) support means disposed within the container, for supporting a tablet of a water-leachable algicide and/or antibacterial substance. The inlet and the outlet are disposed above the support means, and the inlet is disposed at or above level of the outlet, whereby water level in the container is at the level of the outlet, so that water in the container would contact a tablet disposed on the support means.

In a third aspect, the invention provides an in-line P-trap chlorinator comprising (a) a container; (b) an inlet for admitting water to the container; (c) an outlet for discharging water from the container; (d) a conduit connecting the inlet and the outlet to one another, the conduit comprising a lower horizontal portion connecting higher first and second vertical portions to one another, the container and the conduit being so constructed and arranged that water is discharged from the lower horizontal portion of the conduit into the container; and (e) support means disposed within the container, for supporting a tablet of a water-leachable algicide and/or antibacterial substance.

The inlet and the outlet are disposed above the support means, and the inlet is disposed at or above level of the outlet, whereby water level in the container is at the level of the outlet, so that water flowing through the container would contact a tablet disposed on the support means, and would continue to contact the tablet after flow had ceased.

DETAILED DESCRIPTION OF THE INVENTION

Figure 1:
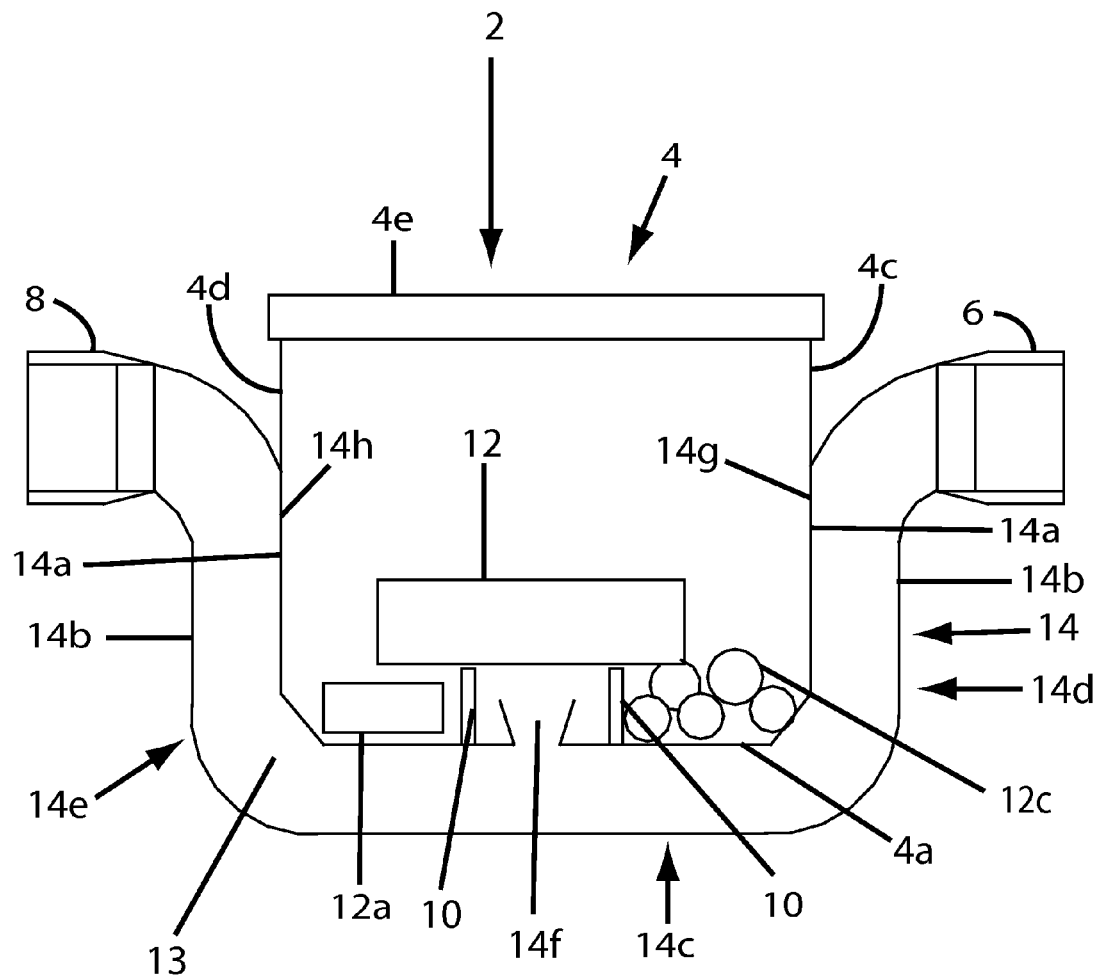
FIG. 1 is a lateral cross-sectional view of a first embodiment of an in-line P-trap chlorinator, made in accordance with the principles of the present invention.

More specifically, reference is made to FIG. 1, in which is shown a first embodiment of an in-line P-trap chlorinator, made in accordance with the principles of the present invention, and generally designated by the numeral 2.

The in-line P-trap chlorinator 2 comprises a container 4; an inlet 6 for admitting water to the container 4; an outlet 8 for discharging water from the container 4; and elevated support means 10, disposed within the container 4, for supporting and immersing a tablet 12 of a water-leachable algicide and/or antibacterial substance in the water, for maximum leachability. The inlet 6 and the outlet 8 are disposed above the support means 10, whereby water level in the container 4 is at level of the inlet 6, so that water flowing through the container 4 would contact and surround a tablet 12 disposed on the support means 10, and would continue to contact and surround the tablet 12 after flow has ceased.

The container 4 has a bottom 4a, and first and second lateral walls 4c and 4d. Water 13 is provided to the container 4 by a conduit 14 having an interior wall 14a, an exterior wall 14b, and a horizontal portion 14c connecting a first vertical portion 14d and a second vertical portion 14e to one another. The interior wall 14a of the horizontal portion 14c of the conduit 14 is the bottom 4a of the container 4, and has an opening 14f for discharging water into the container 4. The interior wall 14a of the first vertical portion 14d of the conduit 14 is a lower portion 14g of the first lateral wall 4c of the container 4. The interior wall 14a of the second vertical portion 14e of the conduit 14 is a lower portion 14h of the second lateral wall 4d of the container 4. The inlet 6 is to the first vertical portion 14d of the conduit 14. The outlet 8 is to the second vertical portion 14e of the conduit 14. If desired, a second algicide and/or antibacterial tablet 12a may be disposed between the support means 10 and the interior wall 14a of the conduit 14. If desired, a granule or granules 12c of an algicide and/or antibacterial substance may be disposed between the support means 10 and the interior wall 14a of the conduit 14. The container 4 is beneficially closed by a cap 4e.

The support means 10 includes a first and second vertical wall extending from the bottom wall 4a and disposed on opposite sides of the opening 14f for supporting a tablet 12 of a water-leachable algicide and/or antibacterial substance in an elevated position over the opening 14f. The opening 14f in the bottom wall of the container 4a is disposed directly below and between the first and second walls of the support means 10 for the tablet 12. The container 4 includes an upward-directed lip positioned inside the container 4 and around the opening 14f between the first and second walls of the support means 10, and the lip tapers from narrow to wide in an upward direction.

The algicide and/or antibacterial substance is preferably an algicide. Even more preferably, the algicide is a material that includes an ingredient which gradually releases chlorine to a flowing stream of water. An example of an ingredient which functions in this manner is calcium hypochlorite, variously referred to as bleaching power, chloride of lime, chlorinated lime, and calcium oxychloride. Examples of other such ingredients are disclosed by U.S. Pat. No. 5,402,813 to Keen.

Figure 2:
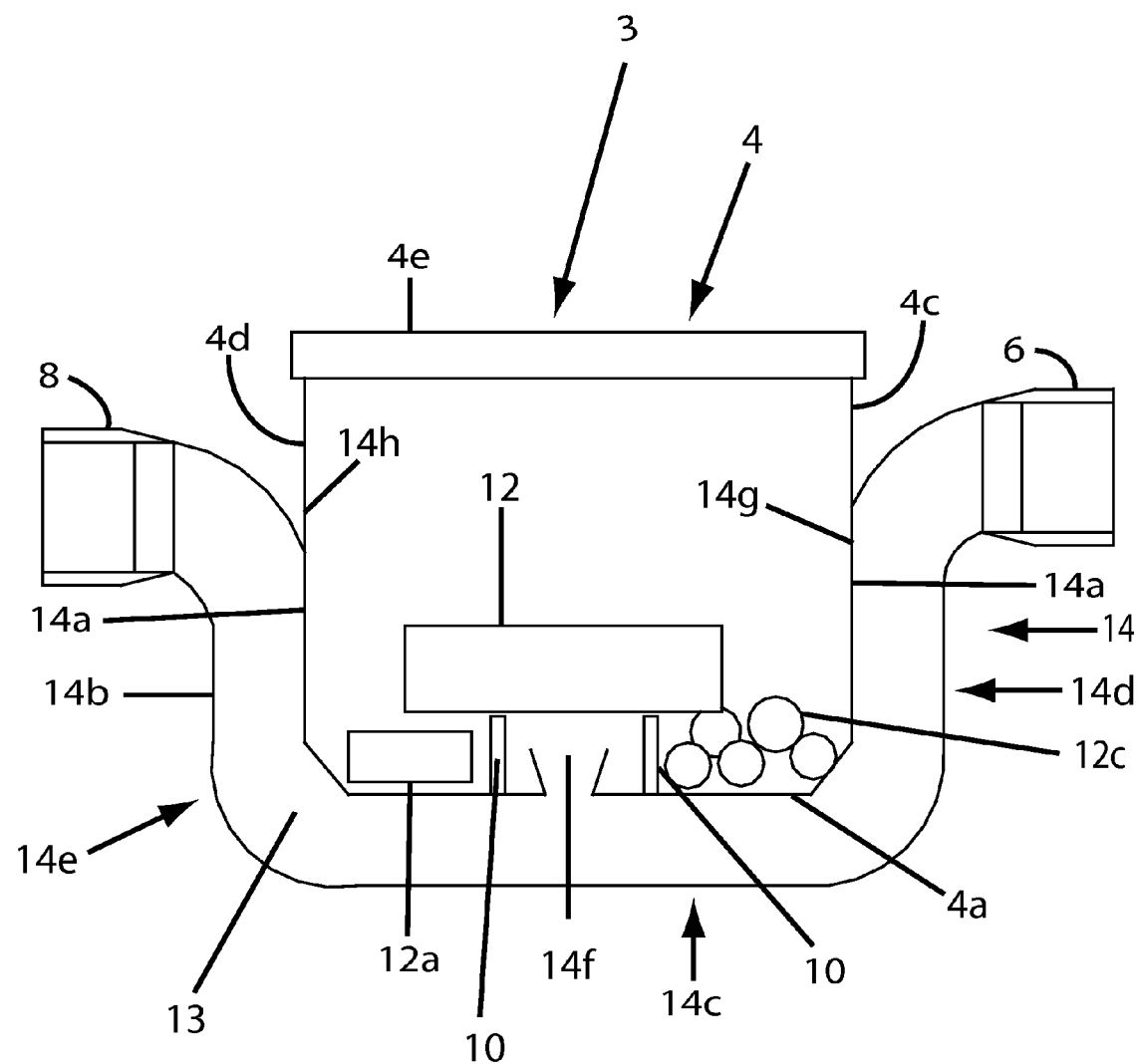
FIG. 2 is a lateral cross-sectional view of a second embodiment of an in-line P-trap chlorinator, made in accordance with the principles of the present invention.

Reference is now made to FIG. 2, in which is shown a second and preferred embodiment of an in-line P-trap chlorinator, made in accordance with the principles of the present invention, and generally designated by the numeral 3. The second embodiment 3 is identical with the first embodiment 2 of the in-line P-trap chlorinator, with the important exception and difference that in the first embodiment 2, the inlet 6 and the outlet 8 are disposed at the same vertical level, whereas in the second embodiment 3, the inlet 6 is disposed above the outlet 8. To prevent gases, vapors, and/or liquids from the algicide and/or antibacterial substance, and/or from a sanitary sewer system from flowing from the container 4 back and through the inlet 6 and a condensation line (not shown) to an air-conditioning or refrigeration unit (not shown) to which the P-trap chlorinator 2 or 3 is connected, the inlet 6 must be disposed above the outlet 8. For this reason, the second embodiment 3 is preferred to the first embodiment 2.

Figure 3:
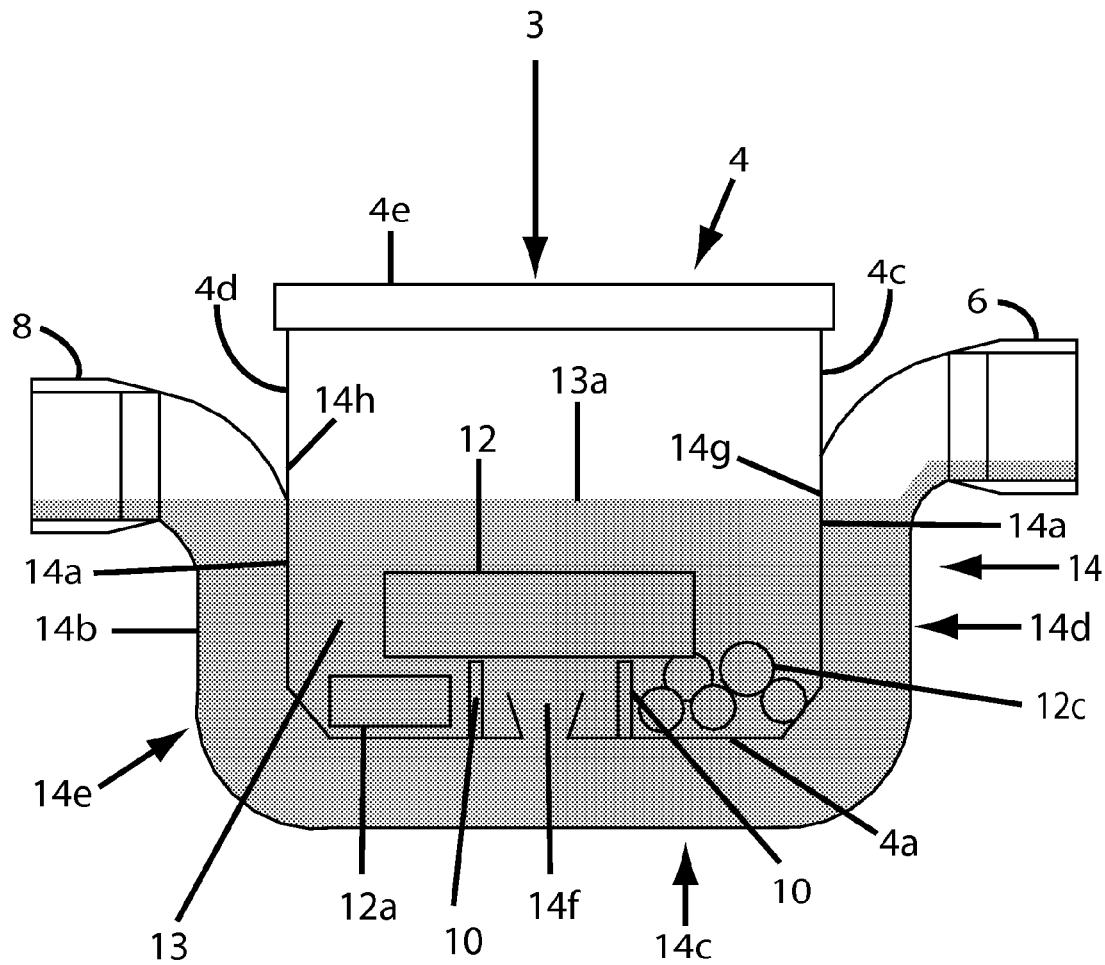
FIG. 3 is a lateral cross-sectional view of the second embodiment of the in-line P-trap chlorinator, with water flowing therethrough.
Figure 4:
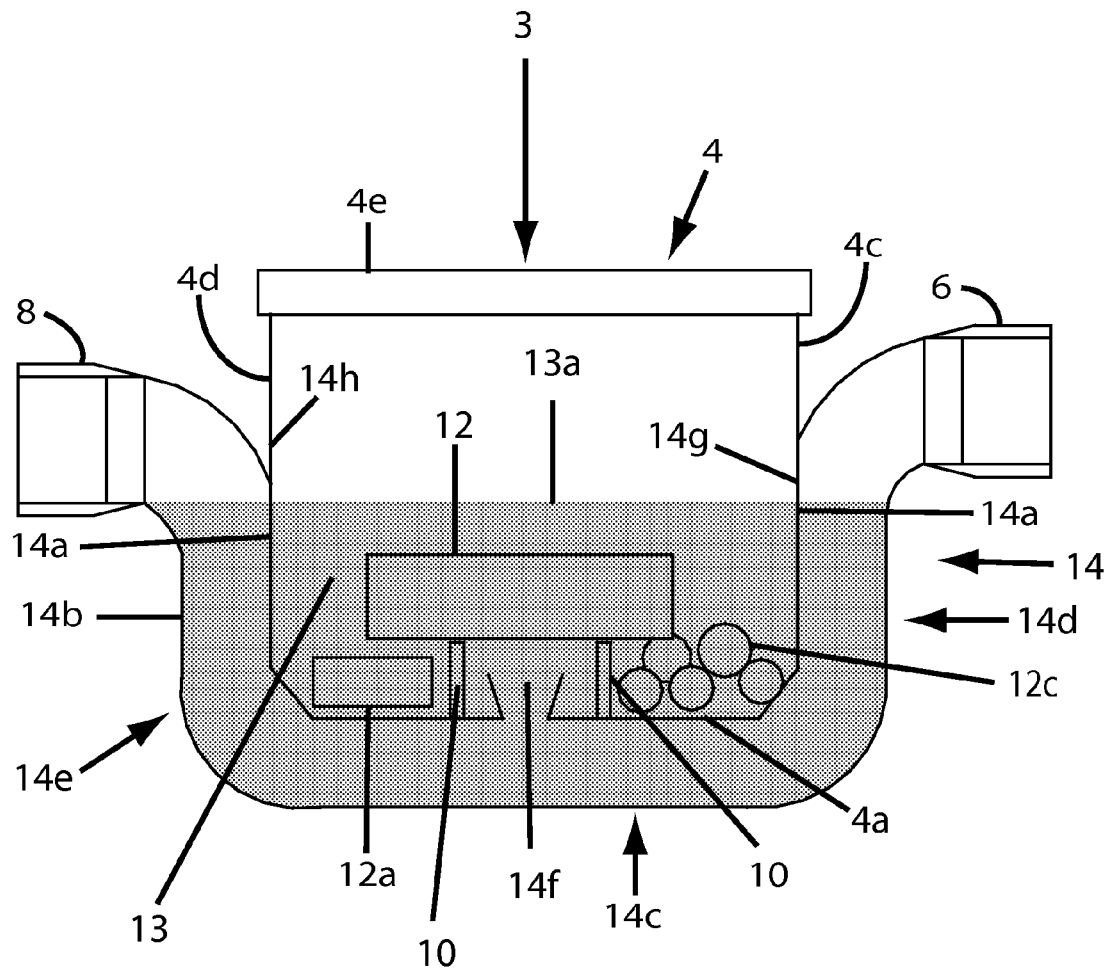
FIG. 4 is a lateral cross-sectional view of the second embodiment of the in-line P-trap chlorinator, after water flow has ceased.

Reference is now made to FIGS. 3 and 4, which illustrate the preferred method of using the present invention.

FIG. 3 shows the in-line P-trap chlorinator 3 with water 13 flowing therethrough. The in-line P-trap chlorinator 3 has been inserted into a condensation drain line (not shown) of an air-conditioning or refrigerating system (not shown). This is done by breaking the drain line, and connecting the inlet 6 and outlet 8 of the P-trap chlorinator 3 to the broken ends of the drain line. When the air-conditioning or cooling unit is "on," there is a flow of water 13 at a water level 13a through the in-line P-trap chlorinator 3, and the algicide and/or antibacterial substance is preventing and/or destroying any algidical and/or bacterial growth from the water 13 as it flows in contact with the algicidal and/or antibacterial substance.

FIG. 4 shows that, when the air-conditioning or refrigeration unit is "off," the water 13 remains in contact with the algiciadal and/or antibacterial substance, thereby ensuring the prevention and/or removal of any algicidal and/or bacterial growth that might otherwise occur, and preventing gases, vapors, and/or liquids such as chlorine, hydrochloric acid, water solutions of chlorine and/or hydrochloric acid, and/or gases, vapors, and/or liquids from a sanitary sewer line (not shown) from passing back from the container 4 through the unit.

Figure 5:
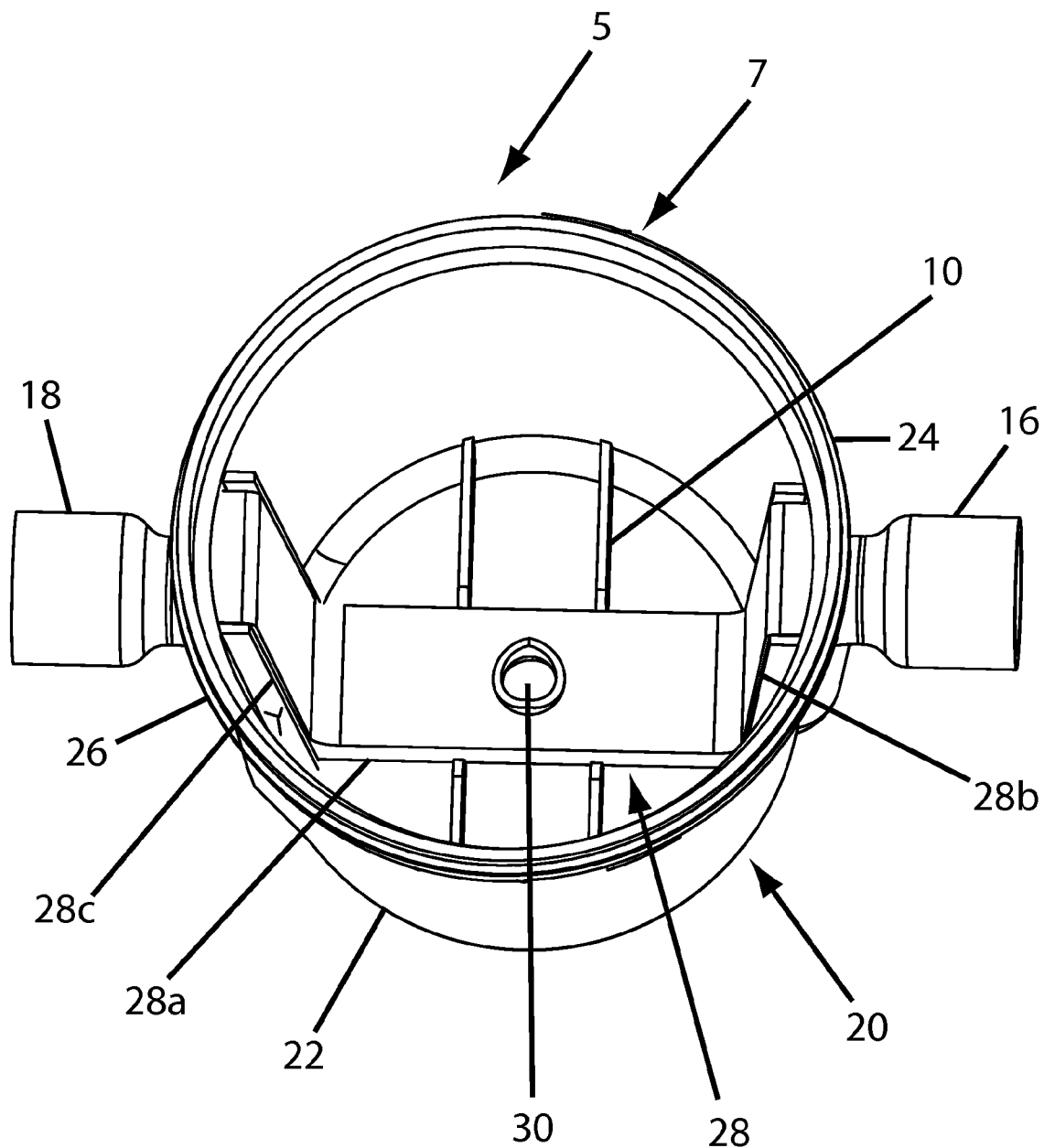
FIG. 5 is a top plan view of third and fourth embodiments of an in-line P-trap chlorinator, made in accordance with the principles of the present invention.
Figure 6:
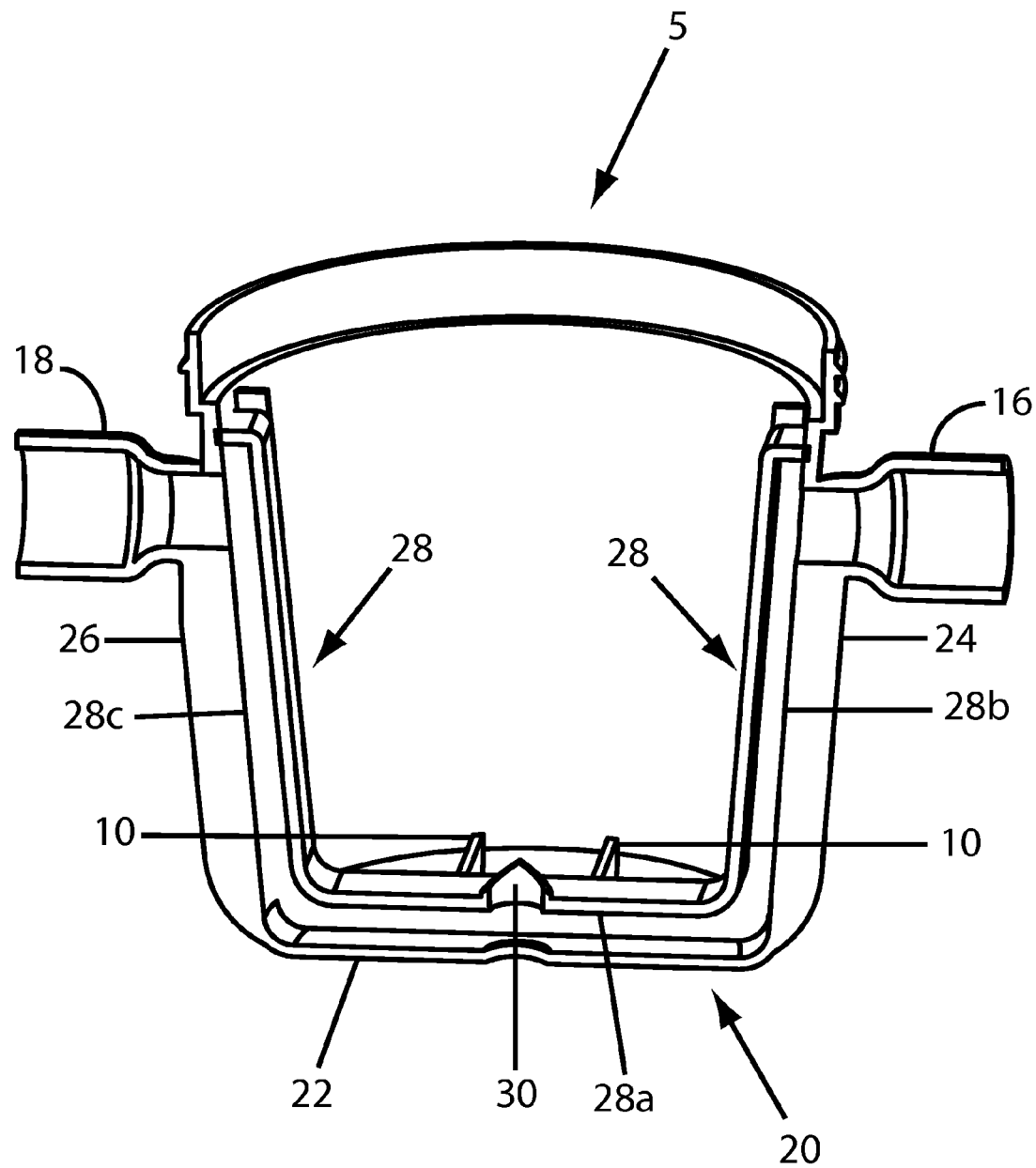
FIG. 6 is a lateral cross-sectional view of a third embodiment of an in-line P-trap chlorinator, made in accordance with the principles of the present invention.
Figure 7:
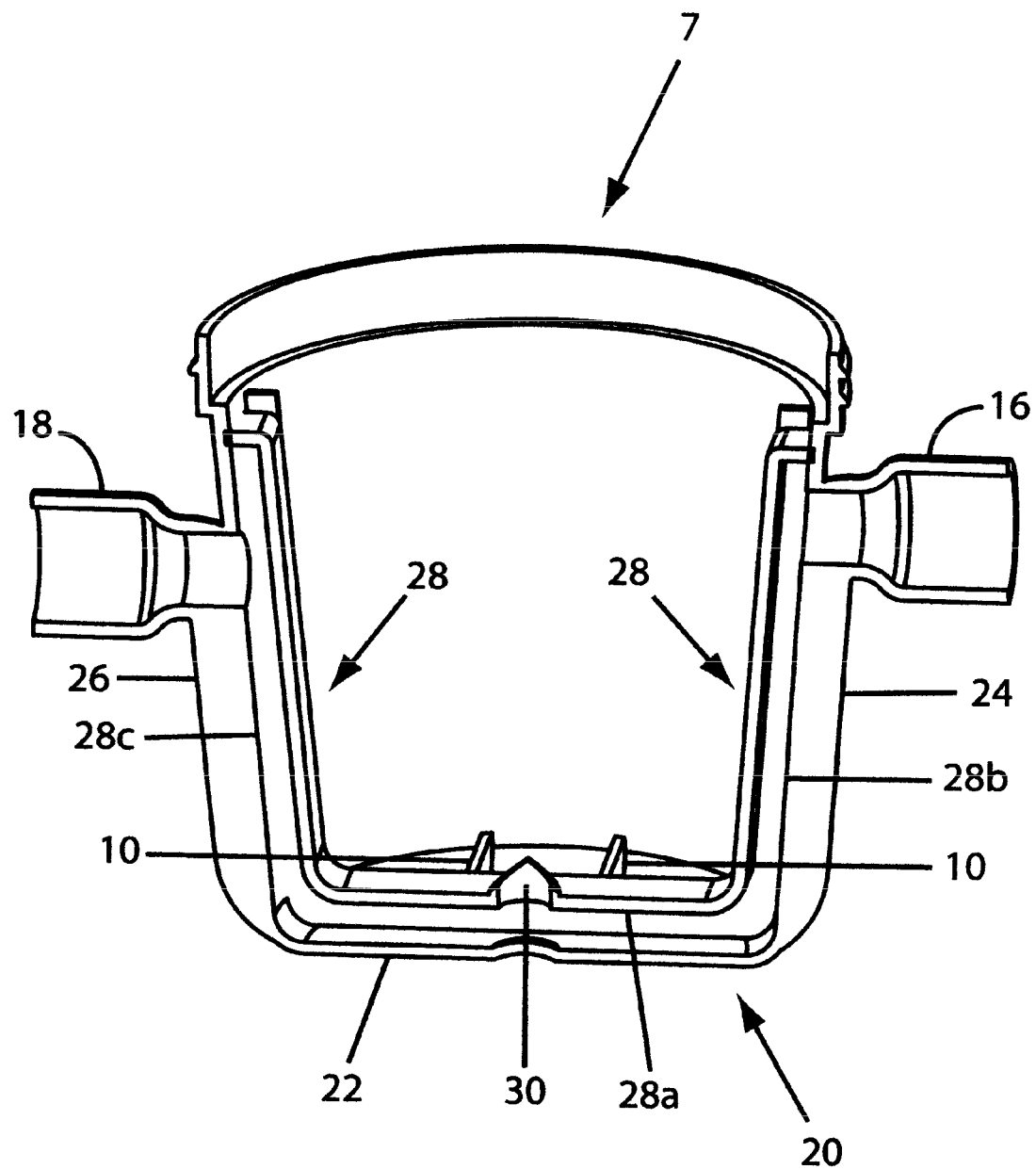
FIG. 7 is a lateral cross-sectional view of a fourth embodiment of an in-line P-trap chlorinator, made in accordance with the principles of the present invention.

Reference is now made to FIGS. 5-7, in which are shown third and fourth embodiments of an in-line P-trap chlorinator, made in accordance with the principles of the present invention, and generally designated by the numerals 5 and 7, respectively. The only difference between the third embodiment 5, FIG. 6, and the fourth embodiment 7, FIG. 7, is that in the third embodiment 5 the inlet 16 and the outlet 18 are at the same level, whereas in the fourth embodiment 7, the inlet 16 is disposed above the outlet 18. For the reason given regarding the second and third embodiments 2 and 3, viz., to prevent back-migration of gases, vapors, and/or liquids, the fourth embodiment 7 is preferred to the third embodiment 5.

Both third and fourth embodiments 5 and 7 comprise a container 20 having a bottom 22, and first and second lateral walls 24, 26. Water enters the container 20 through the inlet 16 at the first lateral wall 24, flows through a conduit 28 having a lower horizontal portion 28a, and higher first and second vertical portions 28b, 28c, and is discharged from the container 20 through the outlet 18 at the second lateral wall 26. Water flowing through the conduit 28 is discharged into the container 20 through an opening 30 in the lower horizontal portion 28a of the conduit 28 near the bottom 22 of the container 20. Support means 10 are constructed and arranged for disposition thereon of a tablet (not shown) of a water-leachable algicide and/or antibacterial substance. The support means 10 are elevated, to immerse the tablet in water for maximum leachability. The lower horizontal portion 28a of the conduit 28 is disposed below the support means 10, so that water flows upward and around a tablet (not shown) disposed on the support means 10, to provide maximum leachability. The container 20 may beneficially be closed by a cap (not shown) similar to the cap 4e shown in FIG. 1.

To manufacture the third and fourth embodiments 5 and 7 of the P-trap chlorinator, the inlet 16, the outlet 18, and the container 20 can be fabricated/molded as a single integral unit. The conduit 28 can be fabricated/molded separately. The inlet-outlet-container unit 16, 18, 28, and the conduit 28 can then beneficially be assembled to provide the P-trap chlorinator 5, 7. Because of ease of fabrication, and because it prevents back-migration of noxious gases, vapors, and/or liquids from the container through the inlet of the P-trap chlorinator, the fourth embodiment 7 is the most preferred embodiment of the P-trap chlorinator While certain specific embodiments and details have been disclosed to illustrate the principles of the present invention, it will be apparent to those skilled in the art that many modifications thereof are possible within the scope of the claimed invention.

We claim:

1. An in-line P-trap chlorinator, comprising:
(a) a container having a bottom wall, and first and second lateral walls;
(b) a conduit for providing water to the container, the conduit having interior and exterior walls, the conduit comprising a horizontal portion connecting first and second vertical portions to one another, the interior wall of the horizontal portion of the conduit being at least a portion of the bottom wall of the container, and the conduit having an opening that extends through the bottom wall of the container for discharging water into the container, the interior wall of the first vertical portion of the conduit being a lower portion of the first lateral wall of the container, the interior wall of the second vertical portion of the conduit being a lower portion of the second lateral wall of the container;
(c) an inlet to the first vertical portion of the conduit, for admitting water to the conduit;
(d) an outlet to the second vertical portion of the conduit, for discharging water from the conduit; and
(e) support means disposed within the container, said support means including a first and second vertical support walls extending from the bottom wall and disposed on opposite sides of the opening for supporting a tablet of a water-leachable algicide and/or antibacterial substance in an elevated position over the opening;
the inlet and the outlet to the conduit being disposed above the support means, and the inlet being disposed above a level of the outlet, whereby a water level in the container is at the level of the outlet to the conduit, so that water flowing through the container would contact a tablet disposed on the support means, and would continue to contact the tablet after flow has ceased, and there would be no backflow through the inlet, the opening in the bottom wall of the container being disposed directly below and between the first and second walls of the support means for the tablet, and the container including an upward-directed lip positioned inside the container and around the opening and between the first and second walls of the support means, and said lip tapering from narrow to wide in an upward direction.

2. An inline P-trap chlorinator, comprising:
(a) a container having a bottom wall, and first and second lateral walls;
(b) an inlet for admitting water to the container;
(c) an outlet for discharging water from the container;
(d) a conduit connecting the inlet and the outlet to one another, the conduit having interior and exterior walls, and a horizontal portion connecting first and second vertical portions to one another, the interior wall of the horizontal portion of the conduit being at least a portion of the bottom wall of the container, and the conduit having an opening that extends through the bottom wall of the container for discharging water into the container; and
(e) support means disposed within the container, said support means including a first and second vertical support walls extending from the bottom and disposed on opposite sides of the opening for supporting a tablet of a water-leachable algicide and/or antibacterial substance in an elevated position over the opening;
the inlet and the outlet being disposed above the support means, and the inlet being disposed above a level of the outlet, whereby a water level in the container is at the level of the outlet, so that water in the container would contact a tablet disposed on the support means, and there would be no backflow through the inlet, the opening in the bottom wall of the container being disposed directly below and between the first and second walls of the support means for the tablet, and the container including an upward-directed lip positioned inside the container and around the opening between the first and second walls of the support means and said lip tapering from narrow to wide in an upward direction.

* * * * *